United States Patent
Heller

(10) Patent No.: US 9,109,893 B2
(45) Date of Patent: Aug. 18, 2015

(54) MICRO-GYROSCOPE AND METHOD FOR OPERATING A MICRO-GYROSCOPE

(71) Applicant: Maxim Integrated Products, Inc., San Jose, CA (US)

(72) Inventor: Martin Heller, Ithaca, NY (US)

(73) Assignee: Maxim Integrated Products, Inc., San Jose, CA (US)

(*) Notice: Subject to any disclaimer, the term of this patent is extended or adjusted under 35 U.S.C. 154(b) by 343 days.

(21) Appl. No.: 13/720,262

(22) Filed: Dec. 19, 2012

(65) Prior Publication Data

US 2013/0160545 A1    Jun. 27, 2013

(30) Foreign Application Priority Data

Dec. 23, 2011  (DE) .................... 10 2011 057 032

(51) Int. Cl.
*G01C 19/56* (2012.01)
*G01C 19/5747* (2012.01)
*G01C 19/5762* (2012.01)

(52) U.S. Cl.
CPC ............ *G01C 19/56* (2013.01); *G01C 19/5747* (2013.01); *G01C 19/5762* (2013.01)

(58) Field of Classification Search
CPC ............... G01C 19/5719; G01C 19/56; G01C 19/5607; G01C 19/5649; G01C 19/5642; G01C 19/574; G01C 19/5747
USPC .............................. 73/504.12, 504.14, 504.04
See application file for complete search history.

(56) References Cited

U.S. PATENT DOCUMENTS

| | | | |
|---|---|---|---|
| 5,428,995 A | 7/1995 | Fersht et al. | |
| 6,281,618 B1 | 8/2001 | Ishitoko et al. | |
| 8,640,541 B2 * | 2/2014 | Abdel Aziz et al. | 73/504.12 |
| 8,726,731 B2 * | 5/2014 | Classen et al. | 73/504.12 |
| 8,783,105 B2 * | 7/2014 | Kuhlmann et al. | 73/504.12 |
| 8,904,866 B2 * | 12/2014 | Hammer | 73/504.12 |
| 2014/0182375 A1 * | 7/2014 | Kim et al. | 73/504.12 |
| 2014/0260610 A1 * | 9/2014 | McNeil et al. | 73/504.12 |

FOREIGN PATENT DOCUMENTS

| | | |
|---|---|---|
| DE | 69829022 D1 | 3/2005 |
| DE | 69829022 T2 | 2/2006 |
| DE | 102010002682 A1 | 9/2011 |
| DE | 102010063471 A1 | 6/2012 |
| WO | 9638710 A1 | 12/1996 |

OTHER PUBLICATIONS

German Search Report for Co-Pending German Application No. 10 2011 057 032.2, mailed on Sep. 24, 2012.

* cited by examiner

*Primary Examiner* — Helen Kwok
(74) *Attorney, Agent, or Firm* — North Weber & Baugh LLP

(57) ABSTRACT

A micro-gyroscope for determining a rate of rotation about a Z-axis includes a substrate and two sensor devices each of which comprises at least one drive mass, at least one anchor, drive elements, at least one sensor mass and sensor elements. The drive mass is mounted linearly displaceably in the direction of an X-axis, and can be driven in an oscillatory manner with respect to the X-axis. The sensor mass is coupled to the drive mass by means of springs. The sensor mass is displaceable in the Y-direction, and sensor elements detects a deflection of the sensor mass in the Y-axis. The two sensor devices are disposed parallel to each other and one above the other in the direction of the Z-axis, and the drive mass in these two sensor devices are coupled to each other by means of a coupling spring.

10 Claims, 2 Drawing Sheets

MICRO-GYROSCOPE AND METHOD FOR OPERATING A MICRO-GYROSCOPE

CROSS REFERENCE TO RELATED APPLICATIONS

The application claims the benefit of German Application Serial No. 10 2011 057 032.2, entitled "Mikro-Gyroskop and Verfahren zum Betreiben eines Mikro-Gyroskops", filed on Dec. 23, 2011, the subject matter of which is incorporated herein by reference.

BACKGROUND

A. Technical Field

The present invention relates to a micro-gyroscope for determining the rate of rotation about a Z-axis, having a substrate and having a first and second sensor device, wherein each sensor device comprises at least one drive mass disposed parallel to the substrate and at least one anchor by means of which the drive mass is attached to the substrate. At least one anchor spring is disposed between the anchor and the drive mass so that the drive mass is mounted linearly displaceably in the direction of an X-axis, and rigidly in the direction of a Y-axis and a Z-axis. Drive elements by means of which the drive mass can be driven in an oscillatory manner in the direction of the X-axis, at least one sensor mass connected to the drive mass by means of springs such that said sensor mass is connected to the drive mass rigidly in the X-direction and Z-direction and displaceably in the Y-direction, and sensor elements for detecting a deflection of the sensor mass in the direction of the Y-axis are also present.

B. Background of the Invention

Generic micro-gyroscopes are known, wherein a plurality of identical sensor devices are disposed adjacent to each other, and the drive masses thereof are coupled to each other. Reliable data capture relative to just one sensor device is thereby provided, because as a rule a plurality of sensor masses are present and are deflected when a rate of rotation occurs. By comparing the measured values of the two sensor masses, a conclusion can be drawn about the correctness of the measurement signals obtained. A disadvantage of said type of micro-gyroscope is the large installation space required for the two sensor devices disposed adjacent to each other on the substrate.

SUMMARY OF THE INVENTION

The object of the present invention is thus to provide micro-gyroscopes that function reliably and are able to provide redundant measurement results, allowing conclusions about the correctness of the measurement to be drawn, and additionally requiring only a small installation space.

The object is achieved by a micro-gyroscope having the characteristics of claim 1 and by a corresponding method for operating a micro-gyroscope.

The micro-gyroscope according to the invention for determining the rate of rotation about a Z-axis comprises a substrate and a first and a second sensor device. Each sensor device has at least one drive mass disposed parallel to the substrate and at least one anchor by means of which the drive mass is attached to the substrate. The drive mass is mounted linearly displaceably in the direction of an X-axis, and rigidly in the direction of a Y-axis and a Z-axis, by means of at least one anchor spring disposed between the anchor and the drive mass. Drive elements by means of which the drive mass can be driven in an oscillatory manner in the direction of the X-axis and at least one sensor mass connected to the drive mass by means of springs such that said sensor mass is connected to the drive mass rigidly in the X-direction and Z-direction and displaceably in the Y-direction are also present. A deflection of the sensor mass in the direction of the Y-axis is detected by sensor elements.

According to the invention, the two sensor devices are disposed parallel to each other and one above the other in the direction of the Z-axis. The drive masses of the first and the second sensor device, referred to below as the first and second drive masses, are connected to each other by means of a coupling spring. By synchronously driving the drive masses of the two sensor devices, when a rate of rotation occurs, synchronous deflection of the sensor masses of the two sensor elements is also expected. The sensor elements associated with each sensor mass thus output identical signals. If the signals do not match, then it can be concluded that, for example, damage has occurred to the sensor or an impact has been made on the sensor. The received signals must thereupon be corrected or discarded.

A substantial advantage of the present invention is that the sensor masses are deflected within the X-Y plane in which the drive mass is also disposed. Installation space outside of the X-Y plane is not required for this sensor. In addition to the small area required by the micro-gyroscope according to the invention on the substrate, a very low installation height is hereby made possible by the micro-gyroscope. The two planes in which the first and second sensor device are disposed can be very close to each other, because no components are displaced out of said plane. The sensor according to the invention is thus very compact in construction, but still reliable with respect to the measurements thereby produced.

The first and second drive mass are preferably attached to the same anchors on the substrate. A compact design is also possible because the drive masses of the first and second sensor device use at least partially the same mountings. One anchor thus extends over a plurality of planes in the Z-direction, so to speak. The anchor is attached at one end to the substrate and allows the individual drive masses of the sensor device to be disposed at different distances from the substrate. Of course, however, each sensor device can have a dedicated mounting and anchor.

In an advantageous embodiment of the invention, the sensor elements are electrode pairs, wherein one electrode is connected to the substrate in a stationary manner, and the other electrode is disposed on the sensor mass that can be displaced in the direction of the Y-axis. The stationary electrodes can thereby be stationary and disposed between the substrate and the first sensor device, between the first and second sensor device, and/or between the second sensor device and a further layer disposed above the second sensor device, such as a cover of the micro-gyroscope.

It is particularly advantageous, when the drive masses are operated in antiphase to each other, if the electrode pairs of the first sensor device have the opposite polarity of the electrode pairs of the second sensor device. After the two sensor mass are deflected in opposite directions to each other in case of an opposite displacement of the drive masses when a Z rate of rotation occurs, it is advantageous if each of the electrode pairs also has the opposite polarity. This results in comparable signals that largely correspond to each other, in order to indicate a correct deflection of the sensor masses.

In order to obtain a further improvement of the micro-gyroscope according to the invention, further sensor devices can also be associated with the first and second sensor devices. It is therefore advantageously possible that the micro-gyroscope comprises a third and fourth sensor device, implemented identically to the first and second sensor device. Said third and fourth sensor devices can either be disposed above the first and second sensor device again, so that not only two planes, but a plurality of planes of sensor devices are present. It is particularly advantageous, however, if the third and fourth sensor device are disposed in the planes of the first and second sensor device. The required area for the sensor device on the substrate is indeed thereby increased, but the capture of the signals and driving of the drive masses is thereby simplified.

Either additional rates of rotation can be captured by the further sensor devices, or, particularly advantageously, a further verification of the sensor signal and additional robustness of the sensor can be obtained. This is particularly the case if the first and second sensor device are connected to the third and fourth sensor device by means of a coupling spring. The drive masses disposed adjacent to each other in one plane thus oscillate either identically or in opposition, and the drive masses disposed diagonally to each other can be driven to oscillate either identically or in opposition, that is, in phase or in antiphase. A plurality of sensor signals is thereby obtained that can be compared to each other or differentiated, whereby the accuracy of the micro-gyroscope is significantly increased.

In a method according to the invention for operating a micro-gyroscope according to one or more of the features of the previously described micro-gyroscope, a rate of rotation about a Z-axis is determined. According to the invention, the drive masses disposed one above the other and having the drive elements are driven to oscillate in antiphase. When the substrate is rotated about a Z-axis, the sensor masses are then deflected in antiphase oscillation in the plane of the associated drive mass by a Coriolis force. The operation of the micro-gyroscope in antiphase is particularly stable and largely free of internal interference. A very clear sensor signal is thereby obtained.

It is also advantageous if, with four sensor devices, the drive masses and sensor masses disposed adjacent to each other one a plane are displaced in antiphase. Said mode of operation also ensures a very reliable sensor signal.

BRIEF DESCRIPTION OF THE DRAWINGS

Further advantages of the invention are described in the following exemplary embodiments. There is showing.

DETAILED DESCRIPTION OF THE PREFERRED EMBODIMENTS

Figure 1:
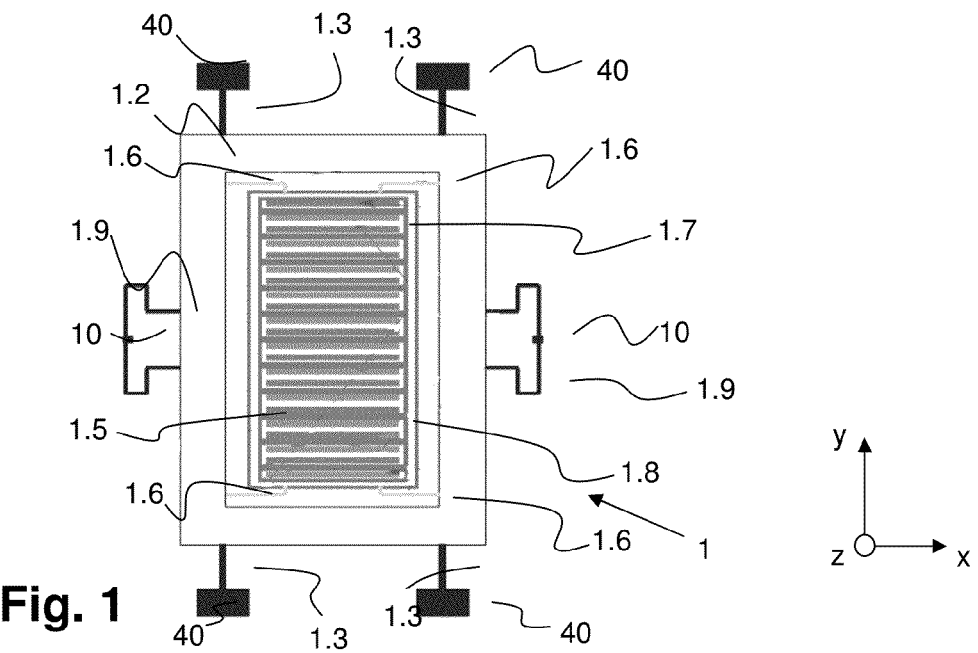
FIG. 1 a sketch of a plan view of a first sensor device,
FIG. 2 the plan view of a sketch of a second sensor device,
FIG. 3 a sketch of a section through the first and second sensor device of FIG. 1 and FIG. 2,
FIG. 4 a sketch of a plan view of a further sensor device,
FIG. 5 a cross section through FIG. 4.

FIG. 1 shows a sketch of a plan view of a first sensor device 1. The first sensor device 1 comprises a frame-shaped drive mass 1.2 that is attached to an anchor 40 by means of anchor springs 1.3. The anchor 40, in turn, is attached to a substrate (not shown) below the drive mass 1.2. The drive mass 1.2 is driven to oscillate in the X-direction by means of drive elements (not shown), such as comb electrodes. A sensor mass 1.5 is disposed in the interior of the frame of the drive mass 1.2. The sensor mass 1.5 is connected to the drive mass 1.2 by means of springs 1.6.

While the anchor springs 1.3 allow displaceability of the drive mass 1.2 in the X-direction, but said mass is rigidly constructed in the Y-direction and Z-direction, the spring 1.6 is designed such that it does indeed move the sensor mass 1.5 together with the drive mass 1.2 in the X-direction, but allows the sensor mass 1.5 to be deflected in the Y-direction when a Coriolis force occurs. The spring 1.6 is also stiff in the Z-direction, so that the sensor mass 1.5 is displaceable only within the X-Y plane.

In order to capture the displacement of the sensor mass 1.5 in the Y-direction, sensor electrodes 1.7 and 1.8 are provided. The sensor electrodes 1.7 and 1.8 have opposite polarity, wherein the sensor electrode 1.7 has a positive and the sensor electrode 1.8 has a negative charge, for example. The distance of the sensor mass 1.5 from the corresponding electrode changes due to the displacement of the sensor mass 1.5 in the Y-direction, whereby a signal change is generated. After said signal change, a conclusion is drawn about a Z rate of rotation, that is, the micro-gyroscope or the substrate on which the anchors 40 are mounted has been rotated about the Z-axis.

Figure 2:
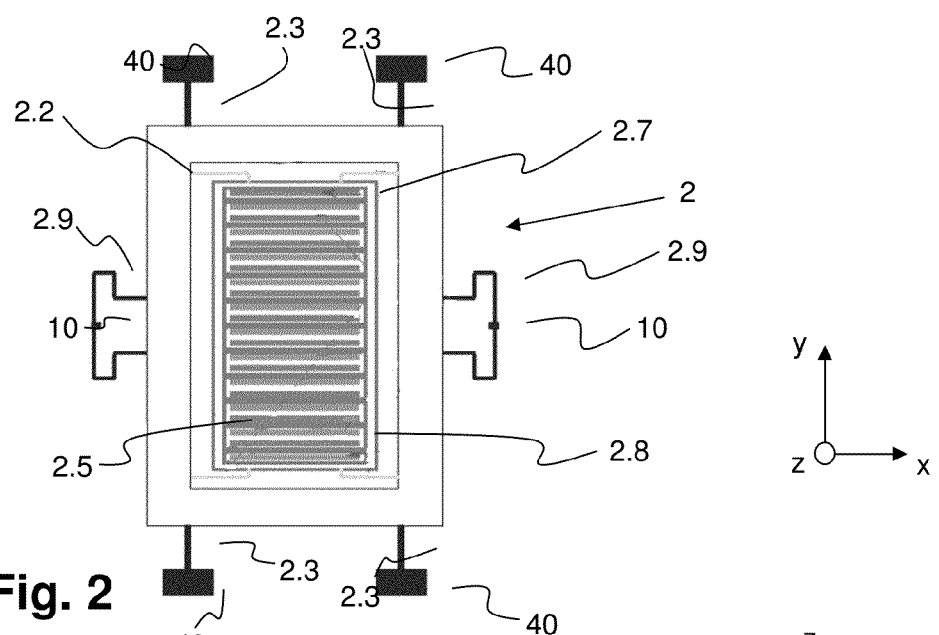

A coupling spring 1.9 and a connection 10 are disposed on the drive mass 1.2. The first sensor device 1 of FIG. 1 is connected to the second sensor device 2 of FIG. 2 by means of the coupling spring 1.9 and the connection 10, which is provided on both sides of the drive mass 1.2. The connection 10, in particular, connects the coupling spring 1.9 to the coupling spring 2.9. The coupling spring 2.9, in turn, is connected to the frame of the drive mass 2.2 of the second sensor device 2. The drive mass 2.2 is also attached to four anchor springs 2.3, bringing about a mounting of the drive mass 2.2 on the anchors 40.

The second sensor device 2 is disposed in a second plane parallel to the first sensor device 1 and parallel to the substrate. It is constructed just like the first sensor device 1. It also comprises a sensor mass 2.5 in the interior of the frame of the drive mass 2.2. that can be deflected in the Y-direction as soon as a Coriolis force occurs due to a rate of rotation about the Z-axis. The sensor electrodes 2.7 and 2.8 associated with the sensor mass 2.5, in contrast, have polarity opposite to that of the sensor electrodes 1.7 and 1.8 of the first sensor device 1. Accordingly, the sensor electrodes 2.7 have negative and the sensor electrodes 2.8 have positive polarity. This ensures that when the two drive masses 1.2 and 2.2 are operating in antiphase, the sensor masses 1.5 and 2.5 are also deflected in antiphase, and a correspondingly correct signal can be output to the analysis device. It also alternatively possible that the sensor electrodes have the same polarity. A corresponding analysis in the analysis electronics can also correctly process said signals.

Figure 3:
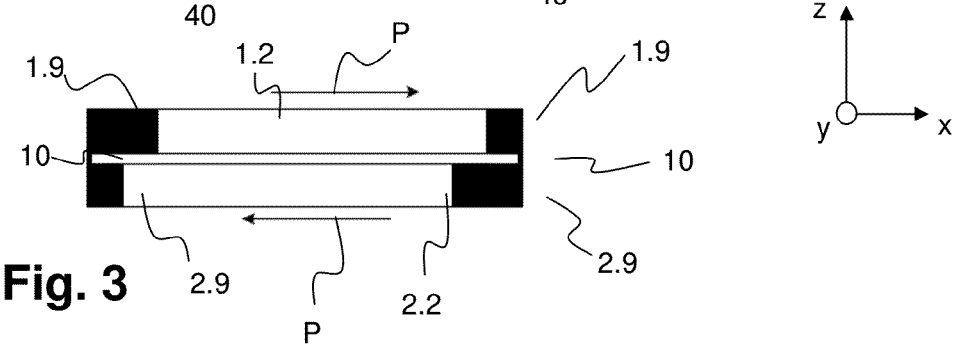

FIG. 3 shows a cross section through the two sensor devices 1 and 2. The arrows P indicate the antiphase displacement of the drive masses 1.2 and 2.2. The drive masses 1.2 and 2.2 move back and forth in the X-direction. Said masses are connected to each other by means of the coupling springs 1.9 and 2.9 and the connection 10. The coupling springs 1.9 and 2.9 are alternately extended and compressed, while the connections 10 remain at rest for in-phase oscillation of the drive masses 1.2 and 2.2.

Figure 4:
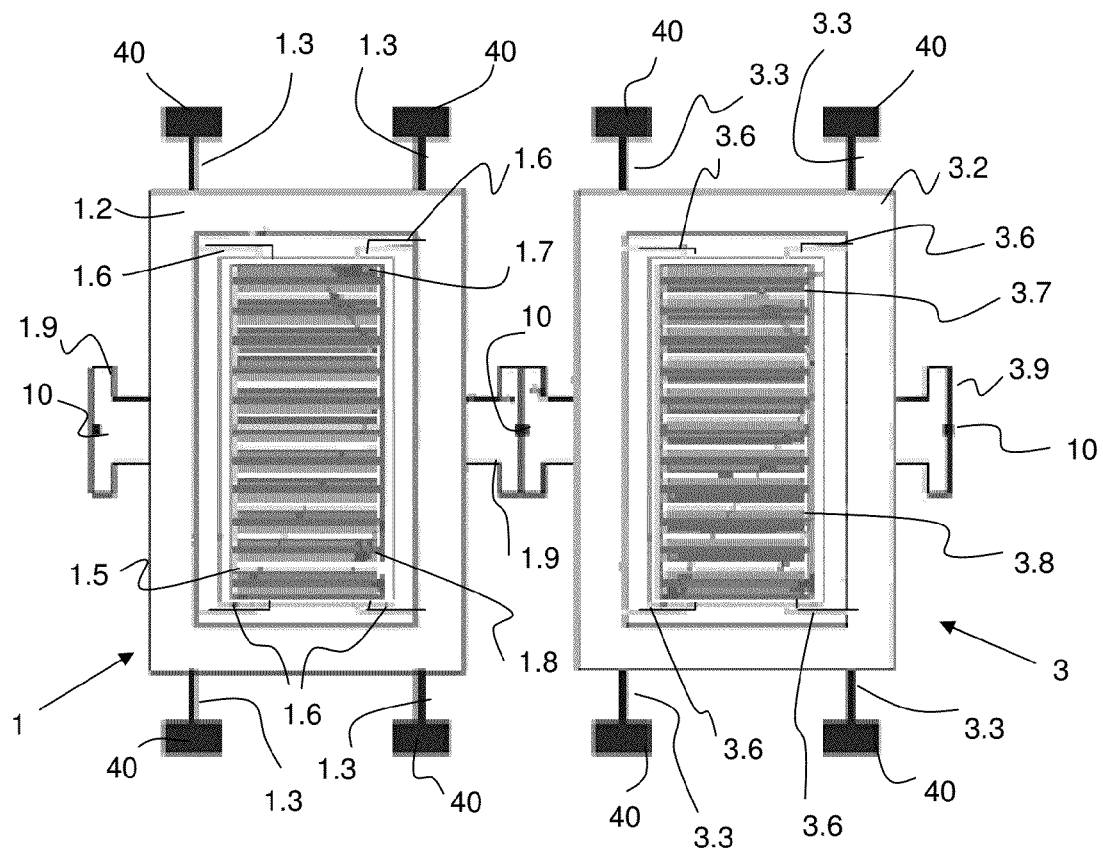

A further exemplary embodiment of the present invention is shown in FIG. 4. The plan view of the sketch shows that two sensor devices 1 and 3 are disposed adjacent to each other in an X-Y plane. The two sensor devices 1 and 3, in turn, are implemented identically. Said devices comprise a drive mass 1.2 and 3.2, a sensor mass 2.5 and 3.5 being disposed in the frames thereof. The springs 1.6 and 3.6 allow a displacement of the sensor mass 1.5 and 3.5 in the Y-direction.

The drive masses 1.2 and 3.2 are attached to the anchors 40 in the X-direction by means of the anchor springs 1.3 and 3.3. The sensor electrodes 1.7 and 1.8, and 3.7 and 3.8, have opposite polarity, that is, sensor electrode 1.7 has positive and sensor electrode 3.7 has negative polarity, while sensor electrode 1.8 has negative and sensor electrode 3.8 has positive polarity. An antiphase deflection of the sensor masses 1.5 and 3.5 corresponding to the antiphase displacement of the drive masses 1.2 and 3.2 is thereby correctly captured.

The first sensor device 1 also has coupling springs 1.9, just as in the exemplary embodiment of FIG. 1. The third sensor device 3 correspondingly comprises coupling springs 3.9. The coupling springs 1.9 and 3.9 disposed between the two drive masses 1.2 and 3.2 are disposed one atop the other, and share a connection 10. The two sensor devices 1 and 3 are driven to oscillate synchronously in antiphase by means of drive means (not shown.)

Figure 5:
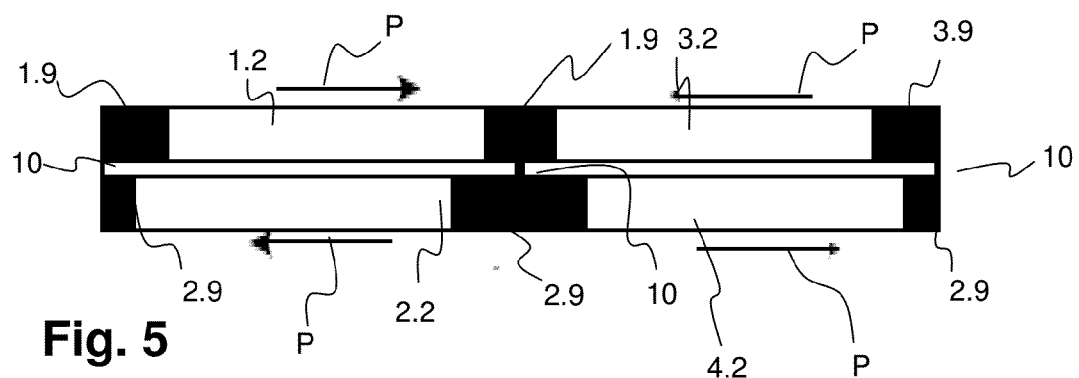

A cross section through the exemplary embodiment of FIG. 4 is shown in FIG. 5. It is evident hereby that the drive masses 1.2 and 3.2 are driven in antiphase to each other. The applies to the sensor devices 2 and 4 disposed thereunder. The arrows P also indicate that the sensor devices 1 and 4, and 2 and 3, disposed diagonally from each other, are each operated synchronously to each other in phase. The two planes having the first and third sensor device 1 and 3, and the second and fourth sensor devices 2 and 4, are connected to each other by means of connections 10. Synchronous operation of the two planes relative to each other is also thereby ensured.

The present invention is not limited to the exemplary embodiments shown. In particular, deviations in the shape of the individual masses or electrodes, and anchors and springs, are possible at any time and can be modified to meet individual requirements.

I claim:

1. A micro-gyroscope for determining a rate of rotation about a Z-axis, comprising:
    a substrate, and
    a first and a second sensor device, wherein each sensor device further comprises:
    at least one drive mass disposed parallel to the substrate,
    at least one anchor by means of which the at least one drive mass is attached to the substrate,
    at least one anchor spring disposed between the at least one anchor and the at least one drive mass, by means of which the at least one drive mass is mounted linearly displaceably in the direction of an X-axis and rigidly in the directions of a Y-axis and a Z-axis,
    drive elements by means of which the at least one drive mass can be driven in an oscillatory manner in the direction of the X-axis,
    at least one sensor mass coupled to the at least one drive mass by means of springs, such that said at least one sensor mass is coupled displaceably in the Y-direction and rigidly in the X-direction and Z-direction to the at least one drive mass,
    sensor elements for detecting a deflection of the at least one sensor mass in the direction of the Y-axis,
    wherein the first and second sensor devices are disposed parallel to each other and one above the other in the direction of the Z-axis, and wherein the at least one drive mass in the first and second sensor device are coupled to each other by means of a coupling spring.

2. The micro-gyroscope according to claim 1, wherein the at least one drive mass in the first and second sensor devices are attached to the same at least one anchor on the substrate.

3. The micro-gyroscope according to claim 1 wherein the at least one drive mass in each case is a frame enclosing the at least one sensor mass.

4. The micro-gyroscope according to claim 1, wherein the sensor elements are electrode pairs in which one electrode is connected to the substrate in a stationary manner and the other electrode is disposed on the at least one sensor mass displaceable in the direction of the Y-axis.

5. The micro-gyroscope according to claim 4, wherein the electrode pairs of the first sensor device have opposite polarity to the corresponding electrode pairs of the second sensor device.

6. The micro-gyroscope according to claim 1, further comprising a third and a fourth sensor device that are implemented identically to the first and second sensor devices.

7. The micro-gyroscope according to claim 6, wherein the third and the fourth sensor devices are disposed in the same planes as the first and second sensor devices.

8. The micro-gyroscope according to claim 6, wherein the first and second sensor devices are coupled to the third and fourth sensor devices by means of a coupling spring.

9. A method for operating a micro-gyroscope to determine a rate of rotation about a Z-axis, comprising the steps of:
    arranging on a substrate a first and a second sensor devices, each sensor device including a drive mass, drive elements, at least one sensor mass, and sensor elements the drive masses in the first and second sensor device being disposed one above the other;
    driving the drive masses in the first and second sensor devices to oscillate in antiphase with the drive elements; and
    deflecting the sensor masses in antiphase oscillation in the plane of the associated drive mass by a Coriolis force when the substrate is rotated about a Z-axis.

10. The method according to claim 9, wherein the micro-gyroscope further comprises a third and a fourth sensor device that are implemented identically to the first and second sensor devices, and wherein the adjacent drive masses and sensor masses disposed in one plane are displaced in antiphase.

* * * * *